United States Patent [19]

Hitomi

[11] Patent Number: 5,322,238
[45] Date of Patent: Jun. 21, 1994

[54] SWITCHABLE DRAG ASSEMBLY FOR A SPINNING WHEEL

[75] Inventor: Yasuhiro Hitomi, Sakai, Japan

[73] Assignee: Shimano Inc., Osaka, Japan

[21] Appl. No.: 795,778

[22] Filed: Nov. 21, 1991

[30] Foreign Application Priority Data

Nov. 27, 1990 [JP] Japan .................. 2-126109[U]

[51] Int. Cl.⁵ .............................................. A01K 89/02
[52] U.S. Cl. .................................. 242/246; 242/319
[58] Field of Search ................ 242/244, 245, 246, 319

[56] References Cited

U.S. PATENT DOCUMENTS

| | | | |
|---|---|---|---|
| 3,033,485 | 5/1962 | Shearer | 242/319 |
| 4,549,702 | 10/1985 | Councilman | 242/246 |
| 4,561,604 | 12/1985 | Marsushima | 242/319 |
| 4,572,448 | 2/1986 | Ban | |
| 4,728,053 | 3/1988 | Hitomi | 242/246 |
| 4,834,311 | 5/1989 | Kaneko | 242/319 |
| 5,040,743 | 8/1991 | Zurcher et al. | 242/246 |
| 5,100,079 | 3/1992 | Toda | 242/246 |
| 5,120,001 | 6/1992 | Kaneko | 242/246 X |
| 5,199,664 | 4/1993 | Kuntze et al. | 242/246 X |

FOREIGN PATENT DOCUMENTS 61-66479 5/1986 Japan.

Primary Examiner—Daniel P. Stodola
Assistant Examiner—Eileen Dunn
Attorney, Agent, or Firm—Dickstein, Shapiro & Morin

[57] ABSTRACT

A drag assembly for a spinning reel comprising a plurality of drag mechanisms axially arranged inside a spool, a drag control element for controlling the drag assembly, a changeover control element for switching a drag force acting on some of said drag mechanisms to a predetermined drag force different from a drag force determined by the drag control element, and an axially movable link member acting on said drag mechanisms requiring the drag force thereof to be changed to a plurality of stages by operating the changeover control element.

11 Claims, 4 Drawing Sheets

SWITCHABLE DRAG ASSEMBLY FOR A SPINNING WHEEL

BACKGROUND OF THE INVENTION

1. Field of the Invention

The present invention relates to a drag assembly having a plurality of drag mechanisms and also to a spinning reel including such a drag assembly.

2. Description of the Related Art

An example of the conventional drag assemblies as noted above is shown in Japanese patent application "Kokai" No. 61-66479 in which two drag adjusting elements are provided for adjusting drag forces of two drag mechanisms, respectively.

In such a reel having two drag mechanisms, a reference drag force is determined by the first drag mechanism while a greater drag force is determined by the second drag mechanism, which can vary the drag force. For instance, when the angler is fighting with a biting fish and the fish suddenly pulls to escape, the drag force applied by the second drag mechanism is slackened to feed out a fishing line, and when the fish ceases to escape, the drag force returns to the initial value to allow the angler to continue to draw the fish.

Such a structure is advantageous in that the angler can provide against a sudden pull of the fish, and that the wound fishing line is restrained from being increased in diameter due to over rotation of the spool under the reference drag force of the first drag mechanism.

However, the drag adjusting element for the second drag mechanism is a screw type to permit a fine adjustment, which requires the angler to watch an adjusted position whenever it is varied and does not provide a sufficient structure against the sudden pull by the fish.

SUMMARY OF THE INVENTION

A primary object of the invention is to provide a reel with a spool and a drag assembly therefor having a compact spool structure, in which drag force can be varied with a good operational efficiency.

In order to fulfill the above-noted object, the present invention is characterized by a drag assembly comprising a plurality of drag mechanisms axially arranged inside the spool, a drag control element for controlling said drag assembly, a changeover control element for switching a drag force acting on some of said drag mechanisms to a predetermined drag force different from a drag force determined by said drag control element, and an axially movable link member acting on said drag mechanisms requiring the drag force to be changed to a plurality of stages by operating said changeover control element.

A spinning reel according to the present invention is characterized by the drag assembly as noted above.

This structure has the following functions and effects.

Drag forces for all of the plurality of the drag mechanisms are determined as a reference force through the drag control element. When the changeover control element is slid or oscillated in one direction to move the link member toward associated drag mechanism or mechanisms, the associated drag mechanism can have an increased drag force. On the other hand, when the changeover control element is slid or oscillated in the opposite direction from the position in which the drag force is increased, the link member is moved away from the associated drag mechanism or mechanisms whereby the drag force is switched to a predetermined reduced drag force. The overall drag force is a total of the predetermined drag force and the reference drag force.

Therefore, the drag force can be switched to the predetermined force simply by sliding or oscillating the changeover control element in one direction, and the user is not required to watch its operational position.

As a result, an instantaneous operation of the changeover control element is possible, which allows the angler to vary the drag force readily and quickly during the fight with the biting fish.

Since the plurality of drag mechanisms for producing such drag forces are axially arranged, only a small radial space for the mechanisms is required as compared with the case in which the drag mechanisms are radially arranged parallel to each other. In addition, the link member is also axially movable, which further contributes to reduce the radial space required by the drag mechanisms and does not unnecessarily increase a diameter of the fishing line wound around the bottom of the spool. This results in another effect that the drag mechanisms can be arranged with the spool per se being prevented from being increased in size by utilizing the originally empty inner space of the spool.

Other objects, features and advantages will be apparent from the following description of the invention referring to the accompanying drawings.

BRIEF DESCRIPTION OF THE DRAWINGS

The drawings illustrate a spinning reel according to the present invention in which.

DETAILED DESCRIPTION OF THE PREFERRED EMBODIMENTS

Figure 1:
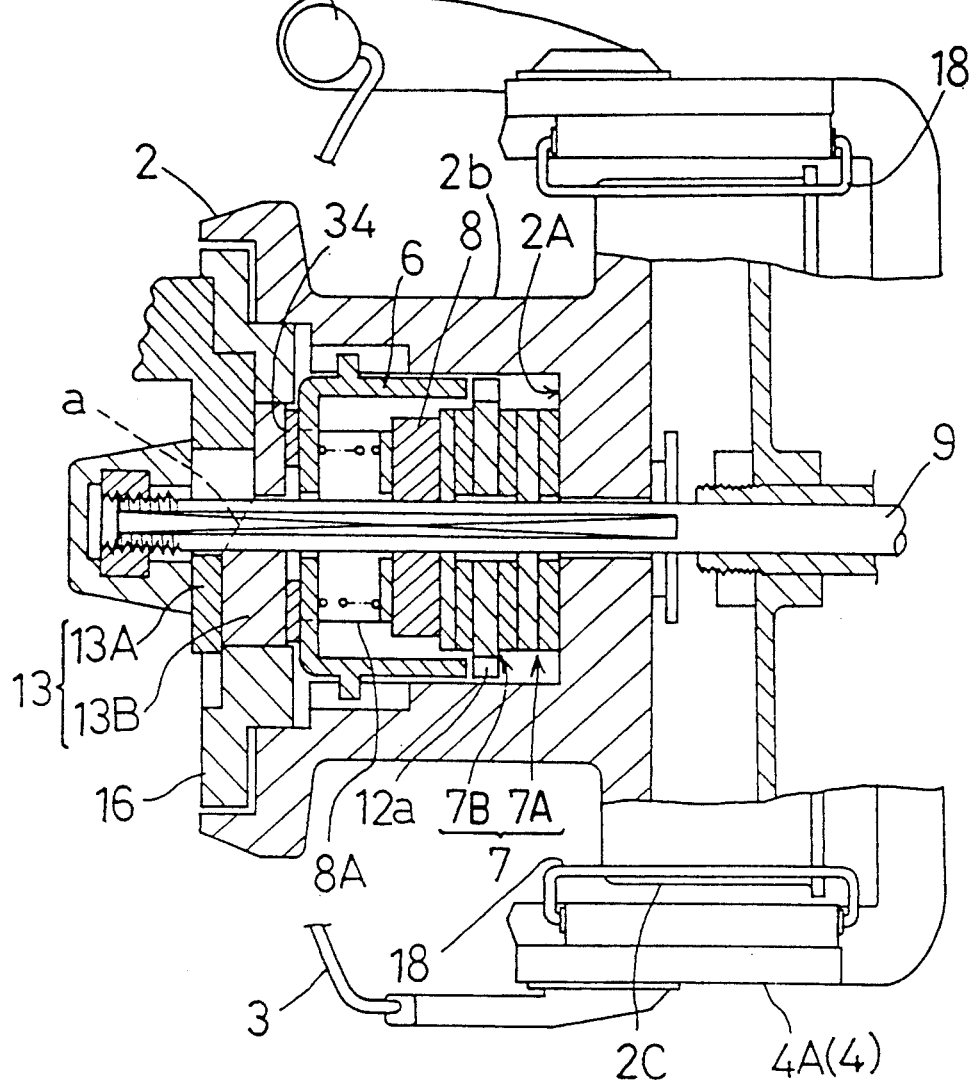
FIG. 1 is a fragmentary vertical section in side view showing a state in which a link member is moved away from a pressure receiving plate.

Embodiments of the present invention will be described in detail hereinafter referring to the drawings.

Figure 6:
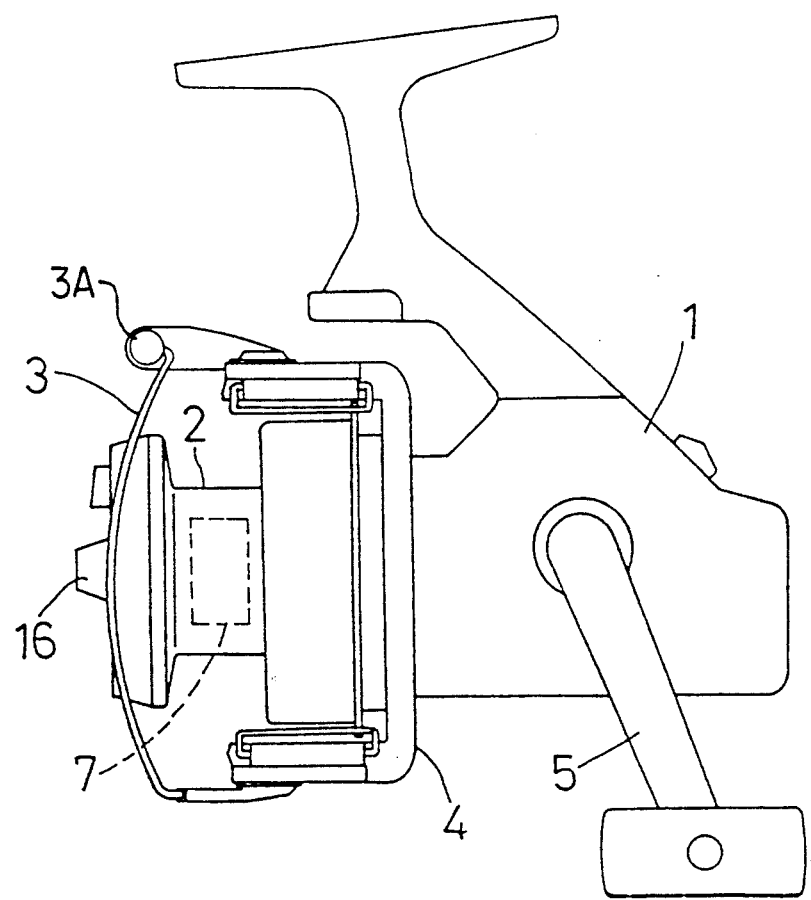
FIG. 6 is a side view of the spinning reel.

FIG. 6 shows a spinning reel comprising a reel body 1, a take-up handle 5 attached to the reel body, a spool 2 mounted in a forward end portion of the reel body for keeping a fishing line, a line roller 3A and a bail arm 3 for winding the fishing line around a line storing portion of the spool 2, an axially rotatable rotary frame 4 on which the bail arm 3 is mounted to be axially rotatable, and a drag assembly 7 mounted on a forward end portion of the spool 2.

Operations of the drag assembly 7 will be described below. Referring to FIGS. 1 through 4, stationary spool shaft 9 is mounted in a fore and aft direction of the reel body 1, on which a spool is loosely fitted. The friction type multi-disk drag assembly 7 mounted inside the spool comprises two pressure plates 10, 10' and three freely rotatable friction plates 11, 11', 11''. The pressure plates 10, 10' are nonrotatable relative to the spool shaft 9. The drag assembly further comprises a pressure receiving plate 12 loosely fitted on the spool shaft 9 between the two friction plates 11', 11 to be rotatable relative to the spool 2 and spool shaft 9.

The drag assembly 7 is formed of two drag mechanisms 7A and 7B. The first drag mechanism 7A includes the inner pressure plate 10, and the first friction plate 11 held between the inner pressure plate 10 and an inner vertical wall 2A of the spool. The second drag mechanism 7B includes the inner pressure plate 10 and the outer pressure plate 10', the two frictions plates 11', 11 held between the two pressure plates 10', and the pressure receiving plate 12 held between the two friction plates 11', 11.

Figure 3:
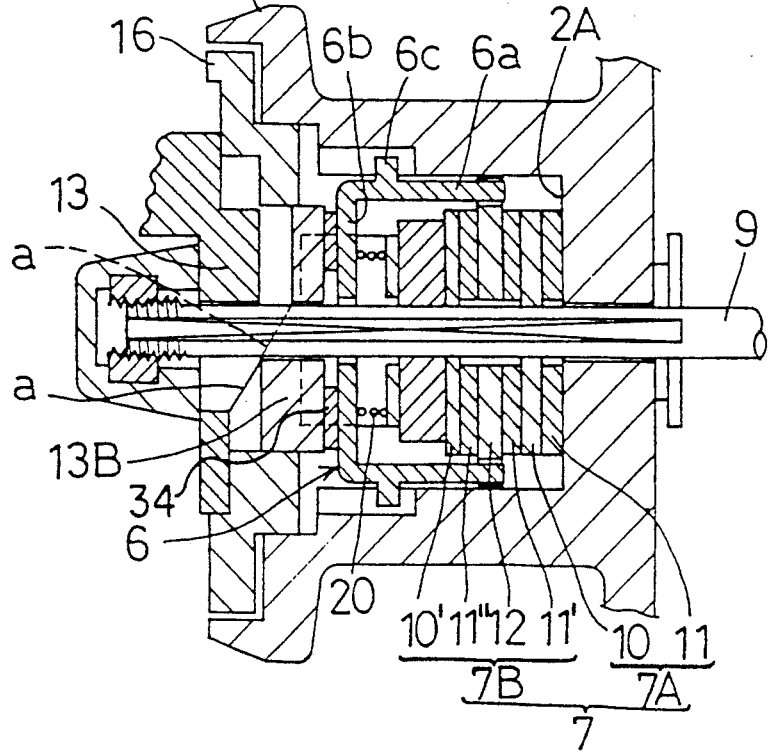
FIG. 3 is a fragmentary vertical section in side view showing a state in which the link member is engaged with the pressure receiving plate.

A drag adjusting structure will be described next. Referring to FIGS. 1 and 3, a drag control element 16 is screwed on a distal end of the spool shaft 9 through a threaded element. An intermediate pressure element 8 is provided for transmitting a pressure force to the drag assembly 7. The drag control element 16 is adjustable by screw movement to allow the intermediate pressure element 8 to be axially movable, thereby to vary a drag force. More particularly, the intermediate pressure element 8 defines forwardly projecting arm portions 8A in lateral sides thereof. Each arm portion has a forward end face 8B contacting the drag control element 16.

A two-position changeover control element 13 is attached to the drag control element 16 so as to shut the inside space of the spool 2. The changeover control element 13 changes the drag force determined by the drag control element 16 to a different predetermined force. The drag control element 16 defines a throughbore 16a into which the changeover control element 13 is inserted to be slidably operable between an operational position and an inoperational position. The changeover control element 13 is manually operable outside of the drag control element 16.

Between the changeover control element 13 and the drag assembly 7 is mounted a link member 6 fitted on the spool shaft 9. The link member 6 includes a base end portion 6b and projecting engaging pieces 6a extending from the base end portion 6b. The link member 6 is axially movable and rotatable in unison with the spool 2 through projections 6c engageable with the spool 2. A spring 20 is mounted between the link member 6 and the intermediate pressure element 8 for axially urging the link member 6 away from the intermediate pressure element 8.

The changeover control element 13 is manually relatively slidable within a thickness of the drag control element 16. The changeover control element 13 includes a manually operable portion 13A rotatable in unison with the drag control element 16, and a mating portion 13B axially slidable relative to and rotatable in unison with the drag control element 16. The manually operable portion 13A defines a cam face a opposing to the mating portion 13B. The manually operable portion 13A is slidable, thereby to cause the mating portion 13B to be axially reciprocatively moved and at the same time the link member 6 to be axially reciprocatively moved. The relative axial movement of mating portion 13B is transmitted to link member 6 via thrust bushing 34.

The pressure receiving plate 12 forming part of the second drag mechanism 7B defines a plurality of cutout portions 12a in outer peripheries thereof for receiving the projecting engaging pieces 6a of the link member 6 thereby to render the link member 6 integral with the pressure receiving plate 12.

According to the above-noted structure, when the changeover control element 13 is slid from the inoperational position in which the projecting engaging pieces 6a of the link member 6 are spaced from the cutout portions 12a of the pressure receiving plate 12 as shown in FIG. 1 to the operational position in which the link member 6 is engaged with the pressure receiving plate 12 as shown in FIG. 3, the pressure receiving plate 12 in turn becomes integral with the spool 2. A drag force is exerted on the spool 2 through the pressure plates 10, 10' friction plates 11', 11 and pressure receiving plate 12.

On the other hand, a drag force of the first drag mechanism 7A is exerted on the spool 2 through the inner pressure plate 10 and the innermost friction plate. The drag force exerted by the first drag mechanism 7A does not vary even when the changeover control element 13 is operated. When the changeover control element 13 is switched from the operational position in which the link member 6 is engaged with the pressure receiving plate 12 to the inoperational position, the connection between the link member 6 and the pressure receiving plate 12 is broken, thereby preventing the drag force from being transmitted from the pressure receiving plate 12 to the spool 2. The drag force determined by the drag control element 16 is applied to the vertical wall 2A of the spool 2 through all the friction plates 11, 11', 11 the pressure plates 10, 10' and the pressure receiving plate 12. Thus, if the changeover control element 13 is switched to the inoperational position, the connection between the pressure receiving plate 12 and the spool 2 is broken, as a result of which the drag force of the second drag mechanism 7B is correspondingly reduced, and at the same time the drag force determined by the first drag mechanism 7A is maintained at the drag force determined by the drag control element 16.

As understood from the above, the determined drag force is variable by switching the pressure receiving plate 12 between two states in which to be connected to and disconnected from the spool 2 only through sliding operations of the changeover control element 13.

Figure 4:
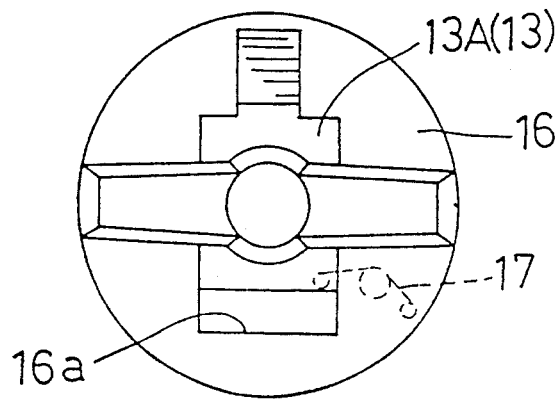
FIG. 4 is a front view of a changeover control element attached to a lid.
Figure 2:
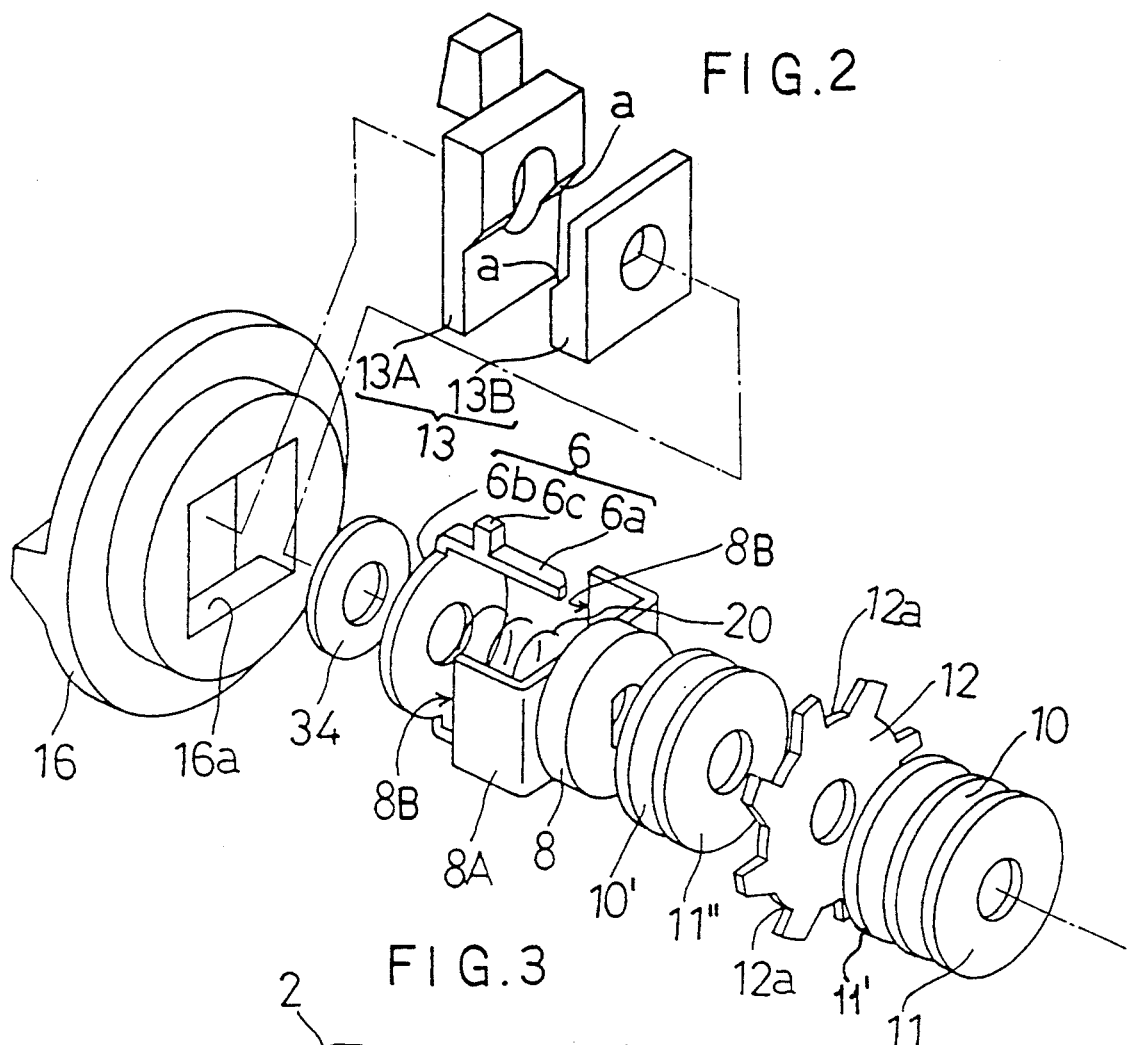
FIG. 2 is an exploded perspective view of a drag assembly.

Numeral 17 in FIG. 4 denotes a toggle spring for selectively maintaining the changeover Control element 13 in the operational position or the inoperational position.

With the above-described structure, the changeover control element 13 is:

(a) maintained in the inoperational position until a strike is sensed against the case that a biting fish tries to escape;

(b) switched to the operational position when the strike is sensed to increase the drag force and a drawing operation is started;

(c) is quickly switched to the inoperational position if the fish suddenly pulls during the drawing operation, thereby to allow the fishing line to be readily fed out; and then (d) is switched to the operational position again when the fish ceases to pull, thereby to continue the drawing operation with the increased drag force.

A series of such operations can be carried out at the angler's disposal.

A fishing line retainer 18 will be set forth next.

Figure 5:
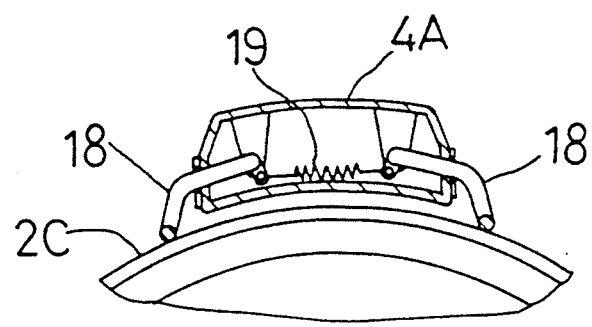
FIG. 5 is a vertical section of a fishing line retainer in side view.

Referring to FIGS. 1 and 5, the fishing line retainer 18 has a function to stop the fishing line from climbing over a rear end wall 2C (a skirt) of the fishing line storing portion 2b. As shown in FIG. 1, the rod-shaped fishing line retainer 18 is supported by support arm 4A on rotary frame 4 carrying the bail arm 3 to be vertically oscillatable about a fore and aft axis. The rod-shaped fishing line retainer 18 is urged by a spring 19 so as to contact an outer periphery of the rear end wall 2C. As shown in FIG. 5, the rod-shaped fishing line retainer 18 is arranged at each lateral side of the support arm 4A and serves to prevent the fishing line from falling off the rear end wall 2C. Two more fishing line retainers may be provided in opposite lateral sides of another support arm 4A, i.e. four retainers in total may be provided instead of two.

Other embodiments will be described hereinafter.

(1) The drag assembly 7 may comprise three or more drag mechanisms. Some of the plurality of drag mechanisms may vary the determined drag forces thereof by operating the changeover control element 13.

(2) The changeover control element 13 may be operable to reduce the determined drag value to zero with respect to any of the drag mechanisms.

(3) The link element 6 may be operable to press the pressure receiving plate 12 to the vertical wall 2A instead of engaging the pressure receiving plate 12, thereby to increase the drag force. When the link element 6 is moved away from the pressure receiving plate 12, the drag force is reduced.

(4) The changeover control element 13 may be oscillatable.

Other modifications of the drag mechanisms 7A and 7B and the changeover control element 13 will be set forth below.

Figure 7:
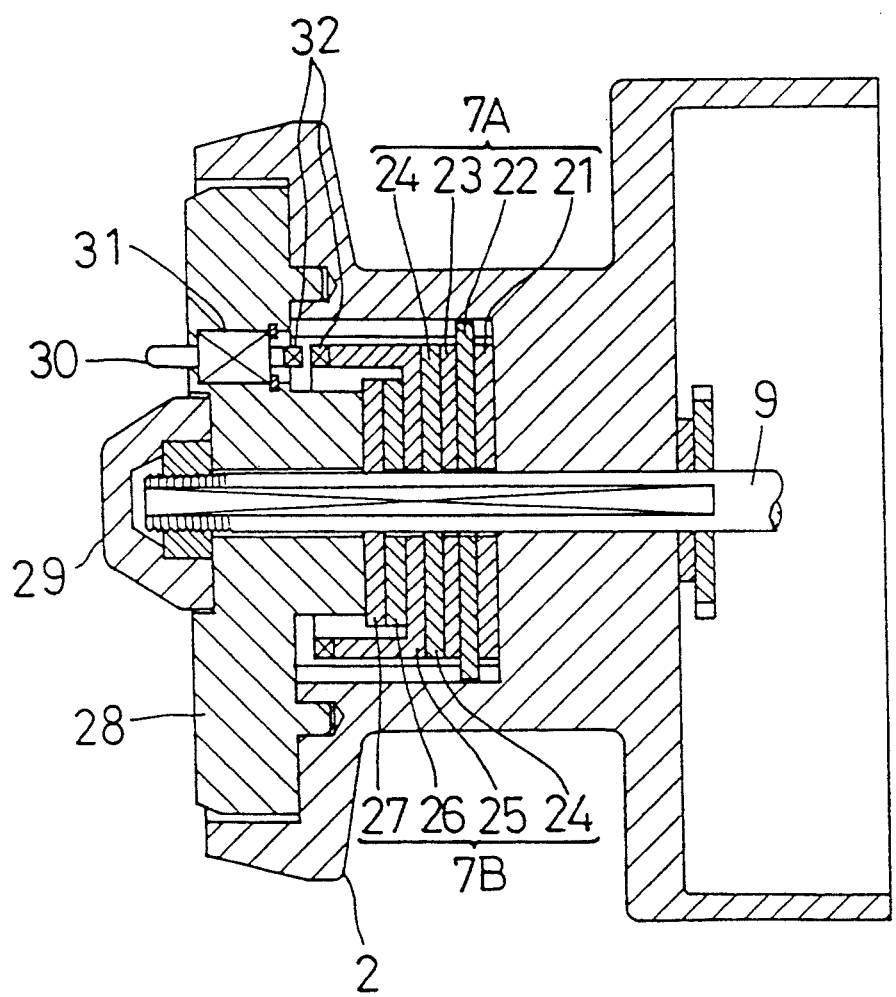
FIG. 7 is a fragmentary vertical section of the fishing line retainer in side view according to another embodiment.

Referring to FIG. 7, the first drag mechanism 7A and the second drag mechanism 7B are arranged inside the spool. The first drag mechanism 7A comprises an innermost friction plate 21, a pressure receiving plate 22 rotatable in unison with the spool 2, friction plate 23 and a pressure plate 24. These elements are arranged from the innermost side toward an outer side of the spool in the mentioned order. The second drag mechanism 7B comprises the pressure plate 24, a link element 25, a friction plate 26 and a pressure plate 27 arranged in the mentioned order from the inner side to the outer side. A lid 28 is mounted outwardly of the second drag mechanism 7B. The lid 28 is axially relatively movable such that an inner face of the lid 28 alternatively may contact and be spaced from the pressure plate 27. The lid 28 is also engaged with the spool 2 to be rotatable in unison therewith about an axis of the spool. A drag adjusting element 29 provided outwardly of the lid 28 is screwed on the spool shaft 9 through a threaded element. The drag adjusting element 29 is adjustable by screw movement thereby to press the first and second drag mechanisms 7A and 7B through the lid 28 to produce and release a drag force.

A push-button type linkage control element 30 is attached to the lid 28, while an engaging portion 32 is defined between the linkage control element 30 and the link element 25. When the linkage control element 30 is pressed with a drag force being determined by the drag adjusting element 29, it is engaged with the link element 25 to connect the link element 25 to the spool 2, thereby to increase the drag force of the second drag mechanism 7B more than the drag force determined by the drag adjusting element 29. On the other hand, the linkage control element 30 is disengaged from the link element 25 with the drag adjusting element 29 being maintained in the adjusted position, thereby to reduce the drag force of the second drag mechanism 7B to the drag force determined by the drag adjusting element 29.

A maintaining mechanism 31 may be provided for selectively maintaining the linkage control element 30 in an engaged position or a disengaged position. The maintaining mechanism 31 may be a friction type to exert a friction force on the linkage control element 30. The linkage control element 30 is pushed and pulled with a force greater than said friction maintaining force to move to the engaged or disengaged position.

Also, the drag force may be switched to two or more stages.

The present invention has described only referring to the preferred embodiments by way of example, but it would be apparent that any modifications are possible within the scope of the appended claims.

What is claimed is:

1. A drag assembly for a spinning reel comprising:
    a reel body;
    a spool shaft extending frontwardly of said reel body, said spool shaft being substantially nonrotatable with respect to said reel body;
    a spool rotatably mounted on said spool shaft, said spool having a side Wall and a bottom wall to form a space in said spool;
    a drag mechanism provided in said space of said spool, said drag mechanism including:
    first and second friction brake means for applying a braking force to a rotation of said spool, said second friction brake means including:
    a pressure receiving plate mounted on said spool shaft, said pressure receiving plate having a peripheral engageable portion,
    drag force control means for applying a pressing force to said bottom wall through said first and second friction brake means to control said brake force;
    link means for linking said pressure receiving plate with said spool, said link means including an engaging piece extended along said spool shaft, and said engaging piece having a first engaging portion at an end thereof to engage with said engageable portion of said pressure receiving plate, said link means being enclosed in said space of said spool in such manner that said link means is substantially nonrotatable with respect to said spool, said link means being displaceable between a first position in which said first engaging portion is engaged with said engageable portion of said pressure receiving plate and a second position in which said first engaging portion is disengaged from said pressure receiving plate; and
    changeover control means for changing said second friction brake means between a braking state and a non-braking state through said displacement of said link means between said first position and said second position.

2. A drag mechanism as defined in claim 1, wherein an engageable groove extending along said spool shaft is formed on a surface of said side wall of said spool, and said drag mechanism further comprising:
    an intermediate pressure element having a pair of arm portions, said intermediate pressure element and said pair of arm portions transmitting a pressure force from said drag force control means to said first and second friction brake means, and wherein said link means includes a second engaging portion protruding radially outwardly of said spool to engage into said engageable groove of said side wall of said spool, said link means being displaceable along said spool shaft between said first position and said second position.

3. A drag mechanism as defined by claim 2, wherein said pair of arm portions of said intermediate pressure element of said drag mechanism enclose a space therebetween, said link means further including a base portion substantially normal to said spool shaft, said engaging arms being extended rearwardly from said base portion, and said base portion being displaceable along said spool shaft in said space enclosed by said pair of arms portions.

4. A drag mechanism as defined by claim 1, wherein said changeover control means includes a changeover control member to switch said link means between said first position and said second position.

5. A drag mechanism as defined by claim 4, wherein said changeover control means comprises a control member displaceable in a direction normal to said spool shaft and a controllable member displaceable along said spool shaft in accordance with said displacement of said control member.

6. A drag mechanism as defined by claim 5, wherein said control member and said controllable member both have slope portions corresponding with each other, said slope portions being relatively movable to convert said displacement of said control member normal to said spool shaft to said displacement of said controllable member along said spool shaft.

7. A drag mechanism as defined by claim 1 further comprising a cover member to cover an opening of said space of said spool, said cover member being rotatable with said spool, and wherein said link means and said changeover control means are provided on said cover member.

8. A drag mechanism defined by claim 7, wherein said changeover control means is a push button control member, and said link means is displaceable along said spool shaft by operation of said push button control member.

9. A drag mechanism as defined by claim 7, wherein said changeover control means includes a fixing mechanism to fix said link means at said first and second positions respectively.

10. A drag mechanism as defined by claim 1, wherein said first and second friction brake means each include a pressure plate, the pressure plates of said first and second friction brake means being nonrotatably mounted on said spool shaft.

11. A drag mechanism as defined by claim 1, wherein said first and second friction brake means each include a friction plate, said friction plates of said first and second friction brake means being rotatably mounted on said spool shaft.

* * * * *